(12) United States Patent
Krajenke et al.

(10) Patent No.: US 8,517,448 B2
(45) Date of Patent: Aug. 27, 2013

(54) DECKLID DAMPER FOR A VEHICLE

(75) Inventors: Gary W. Krajenke, Warren, MI (US);
Alvin N. Standard, Clarkston, MI (US);
Edward L Schulte, White Lake, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 56 days.

(21) Appl. No.: 13/221,445

(22) Filed: Aug. 30, 2011

(65) Prior Publication Data

US 2013/0048399 A1    Feb. 28, 2013

(51) Int. Cl.
*B62D 25/10* (2006.01)

(52) U.S. Cl.
USPC ........................... 296/76; 296/146.11

(58) Field of Classification Search
USPC ................ 296/146.11, 76, 207; 16/289, 290, 16/298, 320, 308, 82
See application file for complete search history.

(56) References Cited

U.S. PATENT DOCUMENTS

| | | | |
|---|---|---|---|
| 2,810,153 A | 10/1957 | Semar | |
| 2,871,505 A | 2/1959 | Clark et al. | |
| 2,894,277 A | 7/1959 | Bogater et al. | |
| 2,986,770 A | 6/1961 | Hammond | |
| 3,085,286 A | 4/1963 | Whitehouse et al. | |
| 3,476,375 A | 11/1969 | Brasseur | |
| 3,643,755 A | 2/1972 | Gionet et al. | |
| 4,186,476 A | 2/1980 | Mair et al. | |
| 4,580,315 A | 4/1986 | Beckwith | |
| 4,776,626 A | 10/1988 | Seyler | |
| 5,234,738 A | 8/1993 | Wolf | |
| 5,361,455 A | 11/1994 | Kiefer | |
| 5,465,852 A | 11/1995 | Koks et al. | |
| 5,549,351 A * | 8/1996 | Park | 296/207 |
| 5,584,099 A * | 12/1996 | Westerdale | 16/245 |
| 5,664,289 A | 9/1997 | Wolda et al. | |
| 5,873,619 A | 2/1999 | Lewkoski et al. | |
| 5,967,586 A | 10/1999 | Duffy et al. | |
| 6,167,589 B1 * | 1/2001 | Luedtke | 16/71 |
| 6,382,704 B1 | 5/2002 | Nastasoiu | |
| 7,469,953 B2 | 12/2008 | Heath et al. | |
| 7,637,543 B2 * | 12/2009 | Ferguson | 292/251.5 |
| 7,815,241 B2 | 10/2010 | Renke et al. | |
| 8,068,959 B2 * | 11/2011 | Shahidi et al. | 701/49 |
| 2006/0230578 A1 | 10/2006 | Renke et al. | |
| 2009/0043456 A1* | 2/2009 | Shahidi et al. | 701/49 |
| 2010/0109371 A1* | 5/2010 | Shoemaker et al. | 296/76 |
| 2010/0179732 A1* | 7/2010 | Shahidi et al. | 701/49 |

* cited by examiner

*Primary Examiner* — Jason S Morrow
(74) *Attorney, Agent, or Firm* — Ingrassia Fisher & Lorenz, P.C.

(57) ABSTRACT

In accordance with exemplary embodiments, a magnetic decklid damper system is provided for a vehicle. The system comprises a decklid coupled to a body of the vehicle via a hinge strap facilitating the decklid moving between a closed position and an open position. The hinge strap includes a first magnetic element coupled to the hinge strap, and a second magnetic element coupled to a body member of the vehicle. The first and second magnetic elements have a common polarity to magnetically repel each other as the decklid moves toward the open position to provide a damping effect for the decklid.

14 Claims, 6 Drawing Sheets

DECKLID DAMPER FOR A VEHICLE

TECHNICAL FIELD

The technical field generally relates to decklids for vehicles, and more particularly to a magnetic decklid damper for the vehicle.

BACKGROUND

It is known to provide a closure such as a decklid for a vehicle to open and close a rear compartment or trunk of the vehicle. Typically, the decklid is attached to the vehicle body with at least one, preferably a pair of, laterally spaced hinges. Generally, decklid hinge systems include a hinge strap coupled to the hinge and the decklid allowing motion of the decklid from a fully open position to a fully closed position. However, conventional decklid hinge systems typically require the use of hinge bumpers to dampen the opening force provided by springs that assist in the opening (raising) of the decklid. These hinge bumpers often have a rebound effect that may cause the decklid to oscillate back toward a partial closing position, before again cycling up to an open position (e.g., "bobble"), which is undesired. Moreover, conventional hinge bumpers provide no dampening effect until after impact with the hinge box or vehicle body. Alternately, gas struts may be employed since gas struts provide a decklid opening force and also provide a dampened full open stop. However, gas struts are more costly than hinge bumpers, which is undesired.

Accordingly, it is desirable to provide a decklid damper for a vehicle. Also, it is desirable to provide a damper that provides a damping effect prior to the decklid reaching the fully open position. Additionally, other desirable features and characteristics of the present invention will become apparent from the subsequent description taken in conjunction with the accompanying drawings and the foregoing technical field and background.

BRIEF SUMMARY

In accordance with exemplary embodiments, a magnetic decklid damper system is provided for a vehicle. The system comprises a decklid coupled a body of the vehicle via a hinge strap facilitating the decklid moving between a closed position and an open position. The hinge strap includes a first magnetic element coupled to the hinge strap a second magnetic element is coupled to a body member of the vehicle. The first and second magnetic elements have a common polarity to magnetically repel each other as the decklid moves toward the open position to provide a damping effect on the decklid.

In accordance with exemplary embodiments, a magnetic decklid damper system is provided for a vehicle. The system comprises a decklid for a vehicle and a hinge box coupled to the vehicle. A hinge strap couples to the hinge box and the decklid facilitating the decklid moving between a closed position and an open position. A magnetic assembly is coupled between the hinge box and the hinge strap and includes a first magnet positioned within a body coupled to the hinge box and a second magnet mounted on a rod coupled to the hinge strap. The rod co-axially translates within the body when the decklid moves between the closed position and the open position. This first magnet and second magnet have a common polarity to magnetically repel each other as the rod moves the second magnet toward the first magnet as the decklid moves toward the open position to provide a damping effect on the decklid.

DESCRIPTION OF THE DRAWINGS

The subject matter will hereinafter be described in conjunction with the following drawing figures, wherein like numerals denote like elements, and.

DETAILED DESCRIPTION

The following detailed description is merely exemplary in nature and is not intended to limit the subject matter of the disclosure or its uses. Furthermore, there is no intention to be bound by any expressed or implied theory presented in the preceding technical field, background, brief summary or the following detailed description.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language.

Additionally, the following description refers to elements or features being "connected" or "coupled" together. As used herein, "connected" may refer to one element/feature being directly joined to (or directly communicating with) another element/feature, and not necessarily mechanically. Likewise, "coupled" may refer to one element/feature being directly or indirectly joined to (or directly or indirectly communicating with) another element/feature, and not necessarily mechanically. However, it should be understood that, although two elements may be described below, in one embodiment, as being "connected," in alternative embodiments similar elements may be "coupled," and vice versa. Thus, although the schematic diagrams shown herein depict example arrangements of elements, additional intervening elements, devices, features, or components may be present in an actual embodiment.

Finally, for the sake of brevity, conventional techniques and components related to vehicle mechanical parts and other functional aspects of the system (and the individual operating components of the system) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention. It should also be understood that FIGS. 1-6 are merely illustrative and may not be drawn to scale.

Figure 1:
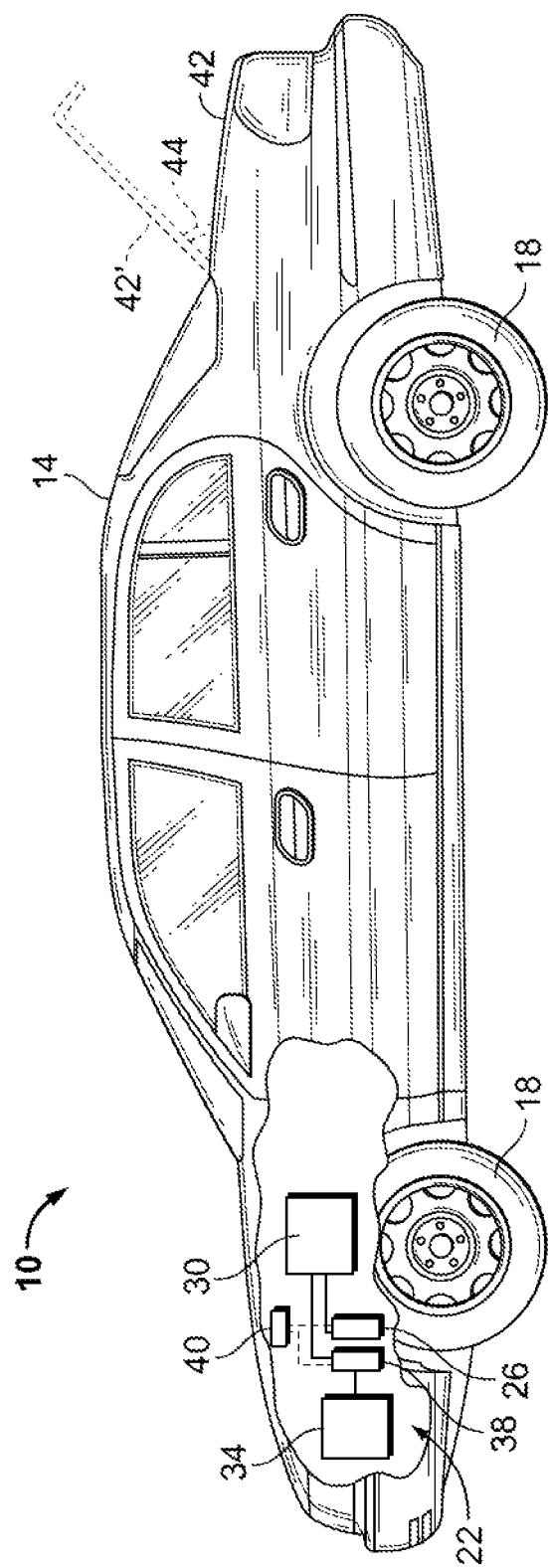
FIG. 1 is an illustration of a vehicle suitable for using exemplary embodiments of the present disclosure.

Referring to the drawings, wherein like reference numbers refer to like components, FIG. 1 shows a vehicle 10 suitable for use with the exemplary embodiments of the present disclosure. The vehicle 10 includes a vehicle body 14 and has a plurality of wheels 18 rotatably mounted with respect to the body 14 and configured to support the body 14 on the ground or road. The vehicle 10 also includes a powertrain 22. In the embodiment depicted, the powertrain 22 includes an electric motor 26 operatively connected to at least one of the wheels 18 to transfer power (torque) thereto for propelling the vehicle 10. The powertrain 22 also includes a battery 30 operatively connected to the motor 26 and configured to selectively supply electrical energy to the motor 26. The powertrain 22 in the embodiment depicted further includes an engine 34 and a generator 38. The engine 34 is operatively connected to the generator 38 to drive the generator 38, which causes the generator 38 to generate electrical energy. The generator 38 is operatively connected to the battery 30 to supply electrical energy thereto for recharging the battery 30. The generator 38 is also operatively connected to the motor 26 to selectively supply electrical energy thereto. A powertrain control module 40 controls the flow of electrical energy between the generator 38, the motor 26, and the battery 30, depending on the driver power command, the state of charge of the battery 30, etc.

The powertrain 22 in the embodiment depicted is commonly referred to as a series hybrid extended-range electric powertrain. However, other powertrain configurations, such as all electric powertrains, parallel hybrid electric powertrains or internal combustion powertrains may be employed within the scope of the claims recited below. Also, the vehicle 10 may be any one of a number of different types of vehicles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD).

As illustrated in FIG. 1, the vehicle 10 includes a decklid 42 that is moveable between a closed position and an open position 42' via a hinge box (not shown in FIG. 1) and a hinge strap 44. The decklid provides a closure for a trunk compartment, which in some embodiments is positioned in the rear of the vehicle 10. In other embodiments, the decklid may be positioned in the front of the vehicle with the powertrain 22 arranged in the rear or mid-vehicle postion. In an SUV embodiment, the decklid 42 may comprise a lift-gate that provides a closure for a cargo compartment.

Figure 2:
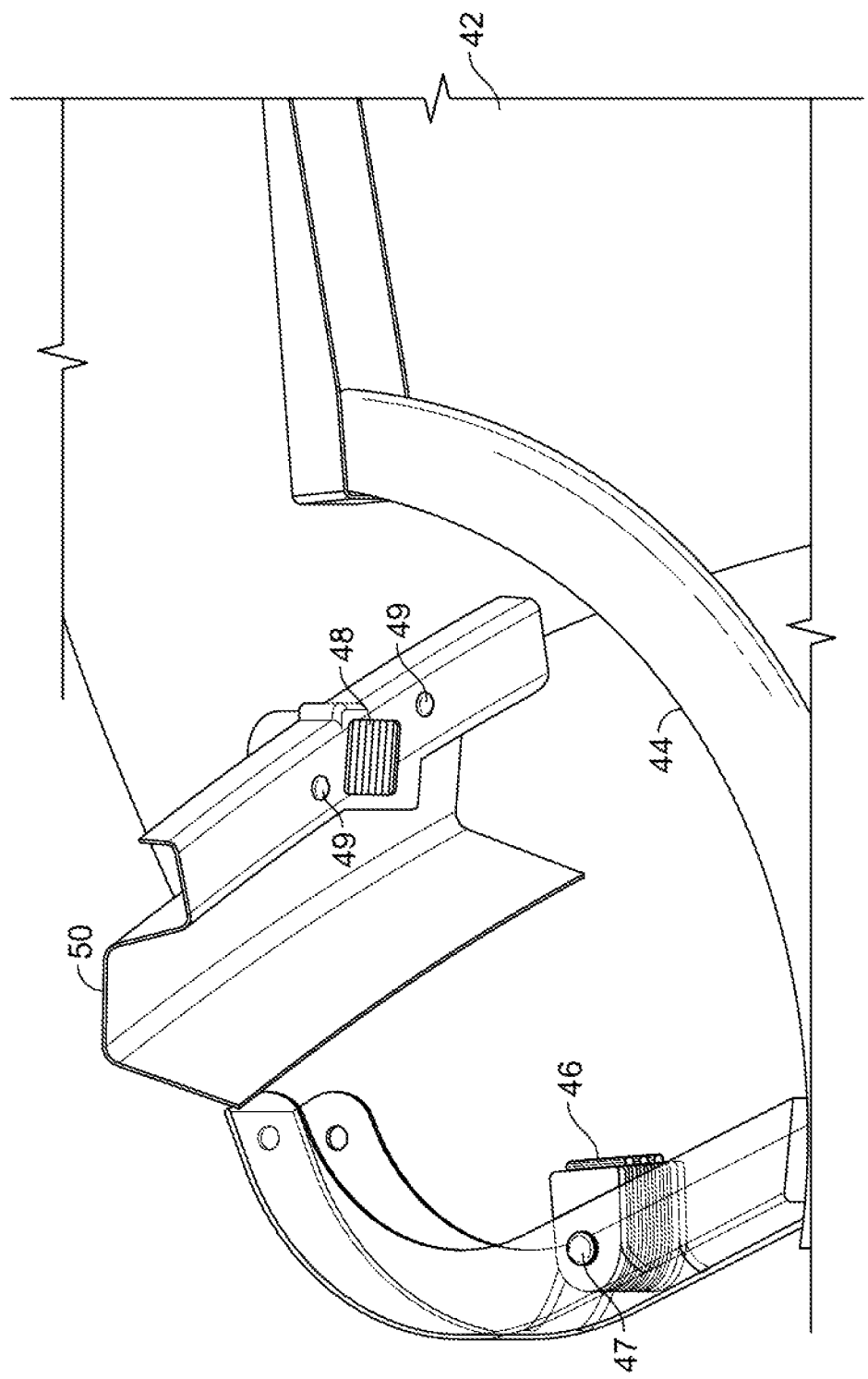
FIG. 2 is an illustration of the decklid of the vehicle of FIG. 1 in a closed position.

FIG. 2 is a more detailed illustration of the decklid 42 in the closed position cut away from the trunk compartment. According to exemplary embodiments, a first magnetic element 46 having a first polarity (either North or South) is connected via a coupling 48 to the hinge strap 44. In one embodiment, the magnetic element comprises a single magnet (e.g., rare earth magnet or electromagnet), while in other embodiments (discussed below), the magnetic element comprises a magnetic assembly having a plurality of magnets and other components. A second magnetic element 48 is coupled 49 via fasteners 49 (or otherwise) to a body member 50 of the vehicle body ((e.g., a rear window support member) at a position where it will align with the first magnetic element 46 when the decklid 42 moves toward the open position as discussed below with reference to FIG. 3B. Since the second magnetic element 48 has a common polarity with the first magnetic element 46, and thus, they magnetically repel each other as the decklid nears the open position. In this way, the magnetic repelling action of the first and second magnetic elements (46 and 48) provides a magnetic damping effect on the decklid 42. The magnetic damping action afforded by the present disclosure reduces the rebound effect (e.g., "bobble" or oscillation) of the decklid as compared to conventional hinge bumpers.

Figure 3A:
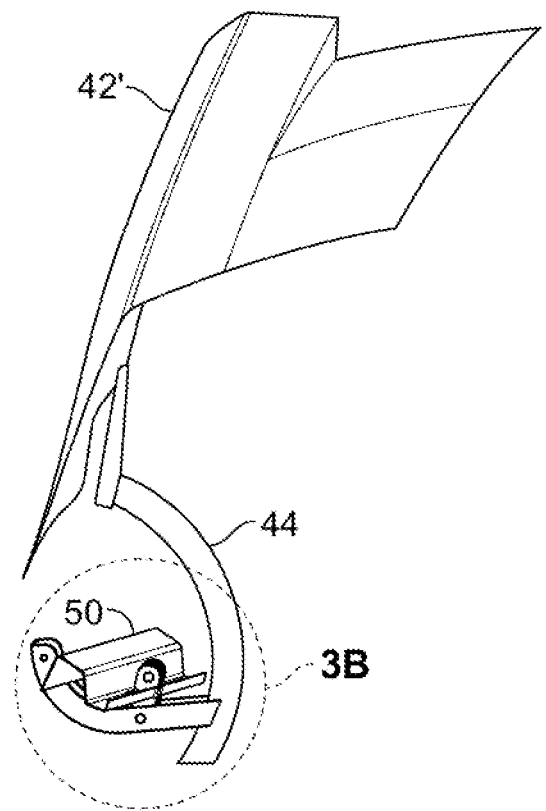
FIGS. 3A and 3B are illustrations of the decklid of the vehicle of FIG. 1 in an open position.
Figure 3B:
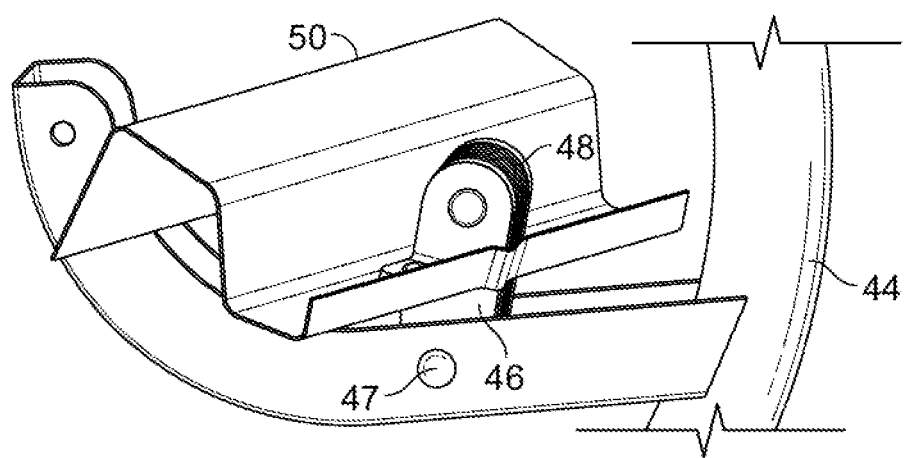

FIGS. 3A and 3B are illustrations of the decklid 42' in the open position. As shown in FIG. 3A, the decklid 42' has moved to the open position, causing the hinge strap 44 to move the first magnetic element 46 into alignment with the second magnetic element 48 resulting in a magnetic repelling effect (due to the common magnetic polarity) between the first and second magnets (46 and 46), and thus, the body member 50 (e.g., rear window support member) and the hinge strap 44 that is coupled to the decklid. Depending upon the strength of the magnetic force provided by the first and second magnetic elements, decklid damping action begins prior to contact between the magnets. This facilitates the use of inexpensive springs (not shown) to provide a decklid opening (lifting) assist without use of more expensive gas struts (albeit, a gas strut embodiment is provided in the event it is preferred by a vehicle designer).

Figure 4A:
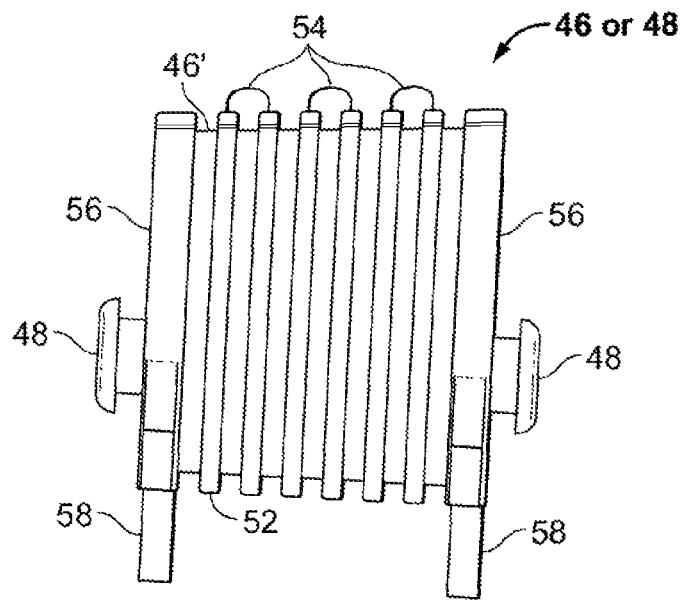
FIG. 4A-4C are illustrations of the magnetic elements of the FIG. 2 accordingly to exemplary embodiments.
Figure 4B:
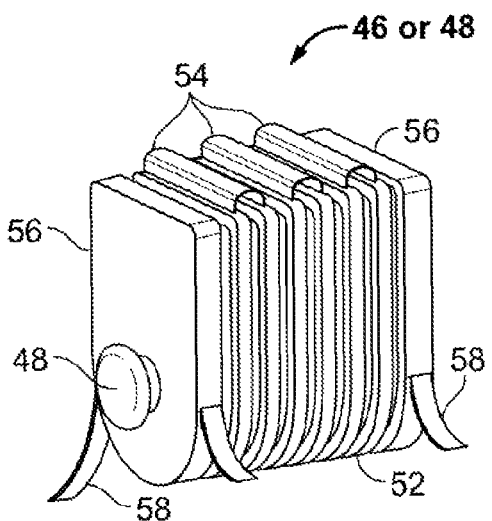
Figure 4C:
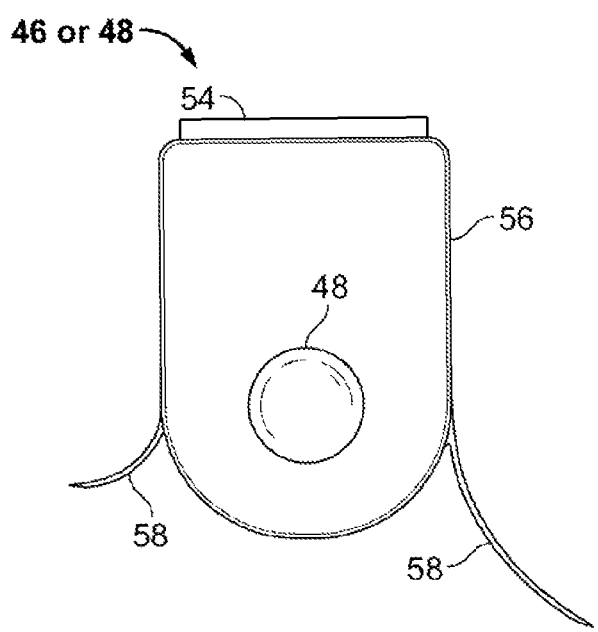

FIG. 4A-4C are illustrations of one embodiment of the magnetic elements (46 or 48). In this embodiment, the magnetic element comprises a magnetic assembly including a plurality of magnets 46' interleaved with a plurality of insulating spacers 52. The insulating spacers distribute the magnetic coupling ability of the magnets 46' over a larger area than that offered by a single magnet of equivalent magnetic coupling ability. The plurality of insulating spacers may be of a plastic or other non-magnetic material, and in one embodiment are formed as flat pairs of insulators having a compliant member 54 therebetween. Once folded to be used in the magnetic assembly, the compliant member 54 becomes a living hinge, which is deformable (being compliant) when the magnetic element 46 magnetically couples to a body member (see FIG. 3B). As the living hinge 54 deforms, it provides a cushioning effect at the moment of contact between the first and second magnetic elements (46 and 48) reducing any metallic contact sound (i.e., "click") that might be produced. The illustrated embodiment of the magnetic assembly also includes end caps 56, which provide a mounting member 48 for coupling the magnetic element 46 to the hinge strap 44 (see FIG. 2). The end caps also provide a loading force via spring elements 58. During assembly, the spring elements 58 are slightly compressed and then the mounting member 48 holds the magnetic element 46 in place and under a loading force, which aids in reducing undesired noise (e.g., rattle) in the passenger compartment of the vehicle 10. The loading springs may optionally be used with the second magnetic element 48, however, being mounted (49) on a more rigid body member 50 (see FIG. 2) the spring elements may not be required for the second magnetic element.

Figure 5:
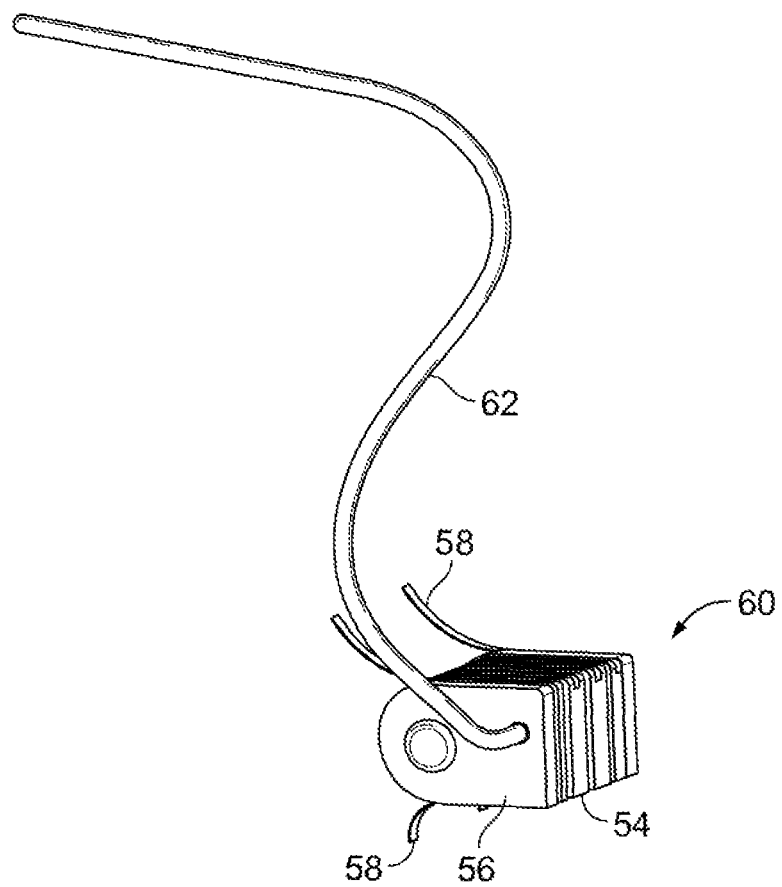
FIG. 5 illustrates an alternate embodiment of the magnetic element suitable for use in exemplary embodiments.

FIG. 5 illustrates an alternate embodiment 60 of the magnetic elements (46 or 48) suitable for use in exemplary embodiments. In this embodiment, the magnetic element 60 comprises an electromagnet. The electromagnetic element 60 may be a single electromagnet or may be an electromagnetic embodiment of the magnetic assembly 46 or 48 (see, FIG. 4A-4C). The electromagnet elements are activated by a conductor 62 that selectively applies power to the electromagnet. In one embodiment, the conductor 62 is coupled to a switch (not shown) that activates the electromagnetic element 60 upon moving the decklid 42 from the closed position toward the open position. Upon returning the decklid 42 to the closed position, the electromagnetic element could be deactivated to conserve energy until the electromagnetic element was again need to assist in retaining the decklid 42' in the open position.

Figure 6A:
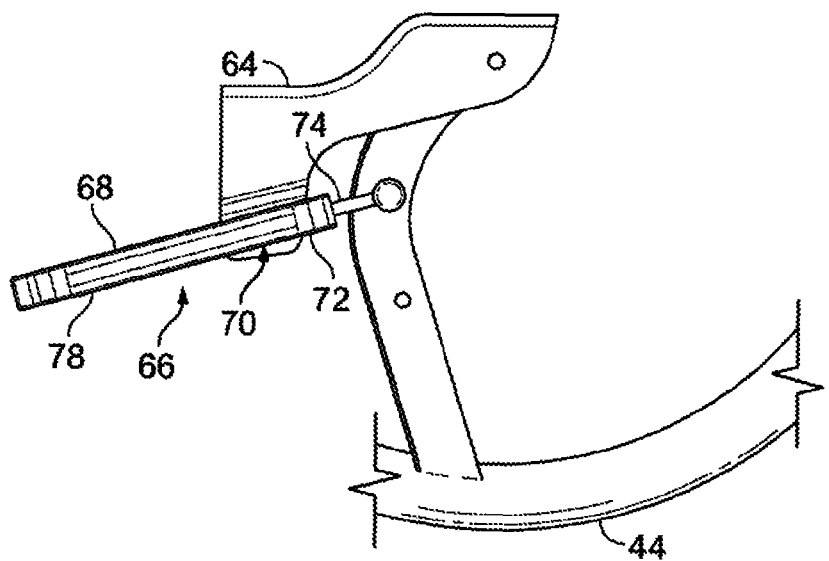
FIGS. 6A and 6B are illustrations of another alternate embodiment of the magnetic element for use in exemplary embodiments.
Figure 6B:
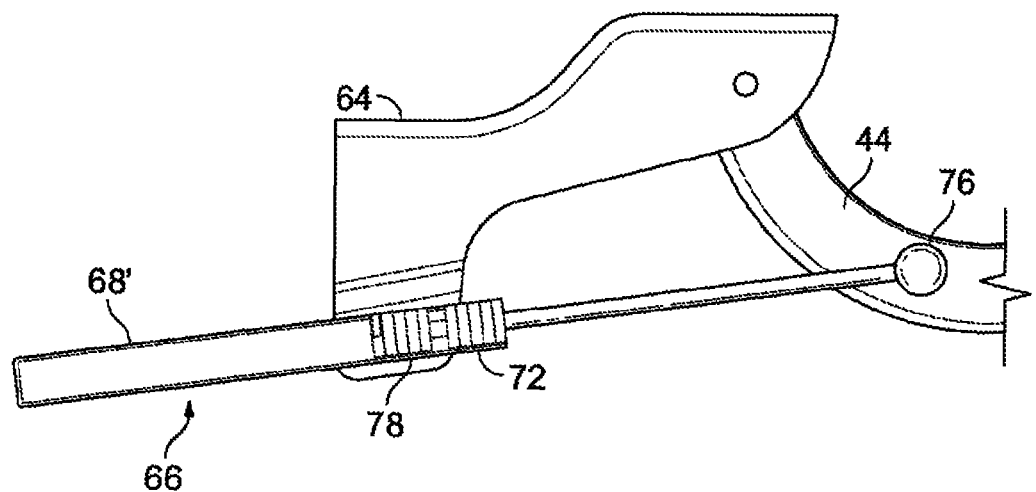

FIGS. 6A and 6B are illustrations of another alternate embodiment of the first and second magnetic elements for use in exemplary embodiments. As shown in FIG. 6A, the hinge strap 44 is coupled to a hinge box 64 and has a magnetic assembly 66 coupled therebetween. The magnetic assembly 66 comprises a body (e.g., tube or cylinder) 68 that is coupled 70 (mounting point is behind the body 68) to the hinge box 64. The body 68 includes a first magnet 72 of a first polarity (either North or South) positioned at one end of the body 68. A rod 74 is connected via a coupling 76 at a proximal end to the hinge strap 44 and co-axially aligned with the body 68 to translate into and out of the body 68 as the decklid moves between the closed position and the open position. In the illustrated embodiment, the rod 74 translates through an opening in the first magnet 72. The rod 74 includes a second magnet 78 having a common polarity with the first magnet (since common magnetic poles repel) coupled at a distal end of the rod 74, which will move toward or away from the first magnet 72 as the rod 74 translates within the body 68. As the decklid (not shown in FIG. 6) moves from the closed position (FIG. 6A) to the open position (FIG. 6B) the first magnet 72 and the second magnet 78 begin to magnetically repel one another, which provides a magnetic damping effect to the decklid. In one embodiment, the body 68 comprises a gas strut having the first magnet 72 and the second magnet 78 integrated therein.

Accordingly, magnetic decklid damping is provided for a vehicle. While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing summary and detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A system, comprising:
   a decklid for a vehicle;
   a hinge strap coupled to a body of the vehicle and the decklid facilitating the decklid moving between a closed position and an open position;
   a first electromagnetic assembly coupled to the hinge strap; and
   a second electromagnetic assembly coupled to a body member of the vehicle and having a common polarity as the first magnetic element to magnetically repel the first magnetic element as the decklid moves toward the open position;
   wherein the first electromagnetic assembly and second electromagnetic assembly are activated upon the decklid moving toward the open position.

2. The system of claim 1, wherein the first electromagnetic assembly and second electromagnetic assembly are deactivated upon the decklid returning to the closed position.

3. The system of claim 1, wherein the first magnetic element and second magnetic element further comprise a first and second magentic assembly each having a plurality of magnets interleaved with a plurality of insulating spacers.

4. The system of claim 3, wherein pairs of the plurality of insulating spacers have a deformable hinge therebetween.

5. The system of claim 4, wherein the deformable hinge between the pairs of insulating spacers deforms when the decklid moves into the open position.

6. The system of claim 5, wherein the first magnetic assembly includes end-caps for the assembly, the end caps having mounting members and providing a loading force to retain the assembly coupled to the hinge strap.

7. The system of claim 1, further comprising a powertrain providing power to wheels to propel the vehicle.

8. A system comprising:
   a decklid for a vehicle;
   a hinge box coupled to the vehicle;
   a hinge strap coupled to the hinge box and the decklid, and facilitating the decklid moving between a closed position and an open position; and
   a magnetic assembly comprising:
      a first magnet positioned within a body coupled to the hinge box; and
      a second magnet having a common polarity as the first magnet mounted on a rod coupled to the hinge strap, the rod co-axially arranged to translate within the body when the decklid moves between the closed position and the open position;
   wherein, the rod moves the second magnet toward the first magnet within the body resulting in a magnetic repelling force between the first and second magnets when the decklid moves toward the open position.

9. The system of claim 8, further comprising a powertrain providing power to wheels to propel the vehicle.

10. A vehicle, comprising:
    a body for the vehicle;
    a decklid providing a closure for a portion of the body;
    a powertrain mounted within the body for providing power to wheels to propel the vehicle;
    a hinge strap coupled to the body of the vehicle and the decklid facilitating the decklid moving between a closed position and an open position; and
    a first electromagnetic assembly coupled to the hinge strap; and
    a second electromagnetic assembly coupled to a body member of the vehicle and having a common polarity as the first magnetic element to magnetically repel the first magnetic element as the decklid moves toward the open position;
    wherein the first electromagnetic assembly and the second electromagnetic assembly are activated upon the decklid moving toward the open position.

11. The vehicle of claim 10, wherein the first electromagnetic assembly and the second electromagnetic assembly are deactivated upon the decklid moving to the closed position.

12. The vehicle of claim 10, wherein the first magnetic element and second magnetic element further comprise a first and second magentic assembly each having a plurality of magnets interleaved with a plurality of insulating spacers.

13. The vehicle of claim 12, wherein pairs of the plurality of insulating spacers have a deformable hinge therebetween.

14. The vehicle of claim 13, wherein the deformable hinge between the pairs of insulating spacers deforms when the decklid moves into the open position.

* * * * *